(12) United States Patent
Bender et al.

(10) Patent No.: US 10,083,092 B2
(45) Date of Patent: Sep. 25, 2018

(54) BLOCK LEVEL BACKUP OF VIRTUAL MACHINES FOR FILE NAME LEVEL BASED FILE SEARCH AND RESTORATION

(71) Applicant: International Business Machines Corporation, Armonk, NY (US)

(72) Inventors: Stefan Bender, Woerrstadt (DE); Mauro Cruciani, Mainz (DE); Michael Loehr, Buettelborn (DE); Christian Mueller, Dichtelbach (DE); Sabine U. Steinhauer, Ingelheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/885,934

(22) Filed: Feb. 1, 2018

(65) Prior Publication Data

US 2018/0137012 A1    May 17, 2018

Related U.S. Application Data

(63) Continuation of application No. 15/297,281, filed on Oct. 19, 2016.

(51) Int. Cl.
*G06F 17/30* (2006.01)
*G06F 11/14* (2006.01)

(52) U.S. Cl.
CPC ...... *G06F 11/1451* (2013.01); *G06F 11/1464* (2013.01); *G06F 17/30194* (2013.01)

(58) Field of Classification Search
CPC .......... G06F 11/1451; G06F 17/30194; G06F 11/1464
See application file for complete search history.

(56) References Cited

U.S. PATENT DOCUMENTS 7,797,279 B1 * 9/2010 Starling .............. G06F 11/1451
707/641
8,117,410 B2    2/2012 Lu et al.
(Continued)

OTHER PUBLICATIONS

Ismail, et al., "Architecture of Scalable Backup Service for Private Cloud," 2013 IEEE Conference on Open Systems (ICOS), Dec. 2-4, 2013, © 2013 IEEE, 6 pages, Sarawak, Malaysia, http://ieeexplore.ieee.org/xpl/login.jsp?tp=&arnumber=6735069&url=http%3A%2F%2Fieeexplore.ieee.org%2Fxpls%2Fabs_all.jsp%3Farnumber%3D6735069.

(Continued)

*Primary Examiner* — Albert M Phillips, III
(74) *Attorney, Agent, or Firm* — Scott S. Dobson

(57) ABSTRACT

A method for backing a computing system includes generating a local history table of filesystem objects that have changed since storing a first backup of the computing system where the local history table includes attributes of the filesystem objects and a set of operations associated with changes to the filesystem objects. The method further includes transferring, from the computing system to a backup server, a second backup of the computing system, where the second backup includes a block level representation of a portion of a data storage medium associated with the computing system. The method additionally includes merging the local history table with a global history table stored on the backup server, the global history table mapping a history of filesystem objects to a set of block level backups of the computing system including the first backup of the computing system and the second backup of the computing system.

1 Claim, 11 Drawing Sheets

(56) References Cited

U.S. PATENT DOCUMENTS

| | | |
|---|---|---|
| 8,234,469 B2 | 7/2012 | Ranade |
| 8,782,008 B1 | 7/2014 | Xing et al. |
| 8,843,451 B2 | 9/2014 | Raichstein et al. |
| 9,104,331 B2 | 8/2015 | Hsu et al. |
| 2005/0246398 A1* | 11/2005 | Barzilai .............. G06F 11/1448 |
| 2013/0080391 A1 | 3/2013 | Raichstein et al. |
| 2014/0095816 A1 | 4/2014 | Hsu et al. |
| 2014/0201152 A1 | 7/2014 | Kumarasamy et al. |
| 2017/0024152 A1 | 1/2017 | Bhagi et al. |

OTHER PUBLICATIONS

Mell et al., "The NIST Definition of Cloud Computing; Recommendations of the National Institute of Standards and Technology", US Department of Commerce, Special Publication 800-145, Sep. 2011, 7 pages.

Bender et al., "File Name Level Based File Search and Restoration From Block Level Backups of Virtual Machines," U.S. Appl. No. 15/297,266, filed Oct. 19, 2016, 25 pages.

Bender et al., "Block Level Backup of Virtual Machines for File Name Level Based File Search and Restoration," U.S. Appl. No. 15/297,281, filed Oct. 19, 2016, 25 pages.

List of IBM Patents or Patent Applications Treated as Related, dated Jan. 26, 2018, 2 pages.

* cited by examiner

| Change Time | Object | Type | Obj-ID | Parent Object ID | Change Operation | New Object |
|---|---|---|---|---|---|---|
| T0_0 | Root | Dir | 1 | - | object create | |
| T1_0 | D1 | Dir | 2 | 1 | object create | |
| T1_1 | F1 | File | 3 | 2 | object create | |
| T1_2 | F2 | File | 4 | 2 | object create | |
| T2_0 | F1 | File | 3 | 2 | file delete | |
| T2_1 | D2 | Dir | 5 | 1 | object create | |
| T2_2 | F3 | File | 6 | 5 | object create | |
| T2_3 | F4 | File | 7 | 5 | object create | |
| T2_4 | D3 | Dir | 8 | 1 | object create | |
| T2_5 | F5 | File | 9 | 8 | object create | |
| T2_6 | F6 | File | 10 | 8 | object create | |
| T3_0 | F2 | File | 4 | 2 | file change | |
| T3_1 | F4 | File | 7 | 2 | object move | |
| T4_0 | D3 | Dir | 8 | 1 | directory delete | |
| T4_1 | F4 | File | 7 | 2 | file rename | F7 |
| T4_2 | D4 | Dir | 11 | 5 | object create | |
| T4_3 | F8 | File | 12 | 11 | object create | |
| T5_0 | D4 | Dir | 11 | 5 | directory rename | D5 |
| T5_1 | D1 | Dir | 2 | 5 | object move | |

FIG. 9

| Object | Type | Ref-ID (given at backup time Tx) | | | | | | | | Oject ID | Parent Object ID |
|---|---|---|---|---|---|---|---|---|---|---|---|
| | | T0 | T1 | T2 | T3 | T4 | T5 | ... | Tn | | |
| Root | Dir | 0 | 0 | 0 | 0 | 0 | 0 | | | 0001 | - |
| D1 | Dir | | 1 | 1 | 1 | 1 | | | | 0002 | 0001 |
| F1 | File | | 2 | | | | | | | 0003 | 0002 |
| F2 | File | | 3 | 3 | 10 | 10 | 10 | | | 0004 | 0002 |
| D2 | Dir | | | 4 | 4 | 4 | 4 | | | 0005 | 0001 |
| F3 | File | | | 5 | 5 | 5 | 5 | | | 0006 | 0005 |
| F4 | File | | | 6 | | | | | | 0007 | 0005 |
| F4 | File | | | | 11 | | | | | 0007 | 0002 |
| D3 | Dir | | | 7 | 7 | | | | | 0008 | 0001 |
| F5 | File | | | 8 | 8 | | | | | 0009 | 0008 |
| F6 | File | | | 9 | 9 | | | | | 0010 | 0008 |
| F7 | File | | | | | 12 | 12 | | | 007 | 0002 |
| D4 | Dir | | | | | 13 | | | | 0011 | 0005 |
| F8 | File | | | | | 14 | 14 | | | 0012 | 00011 |
| D5 | Dir | | | | | | 15 | | | 0011 | 0005 |
| D1 | Dir | | | | | | 16 | | | 0002 | 0005 |

BLOCK LEVEL BACKUP OF VIRTUAL MACHINES FOR FILE NAME LEVEL BASED FILE SEARCH AND RESTORATION

BACKGROUND

The present disclosure relates to computer data storage systems, and more specifically, to generating block level backups of virtual machines to enable file name level based searching for, and restoration of, files in the block level backups.

SUMMARY

According to embodiments of the present disclosure, a method for backing up a computing system includes generating a local history table of filesystem objects that have changed since storing a first backup of the computing system. The local history table includes attributes of the filesystem objects and a set of operations associated with changes to the filesystem objects. The method further includes transferring, from the computing system to a backup server, a second backup of the computing system, where the second backup includes a block level representation of at least a portion of a data storage medium associated with the computing system including the changed filesystem objects. The method additionally includes merging the local history table with a global history table stored on the backup server, the global history table mapping a history of filesystem objects to a set of bock level backups of the computing system including the first backup of the computing system and the second backup of the computing system.

Other embodiments are directed to a computer system and a computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 9 illustrates an example local history table for tacking a history of filesystem objects, according to various embodiments.

FIG. 10 illustrates an example global history table for tracking a history of filesystem object changes, according to various embodiments.

Figure 1:
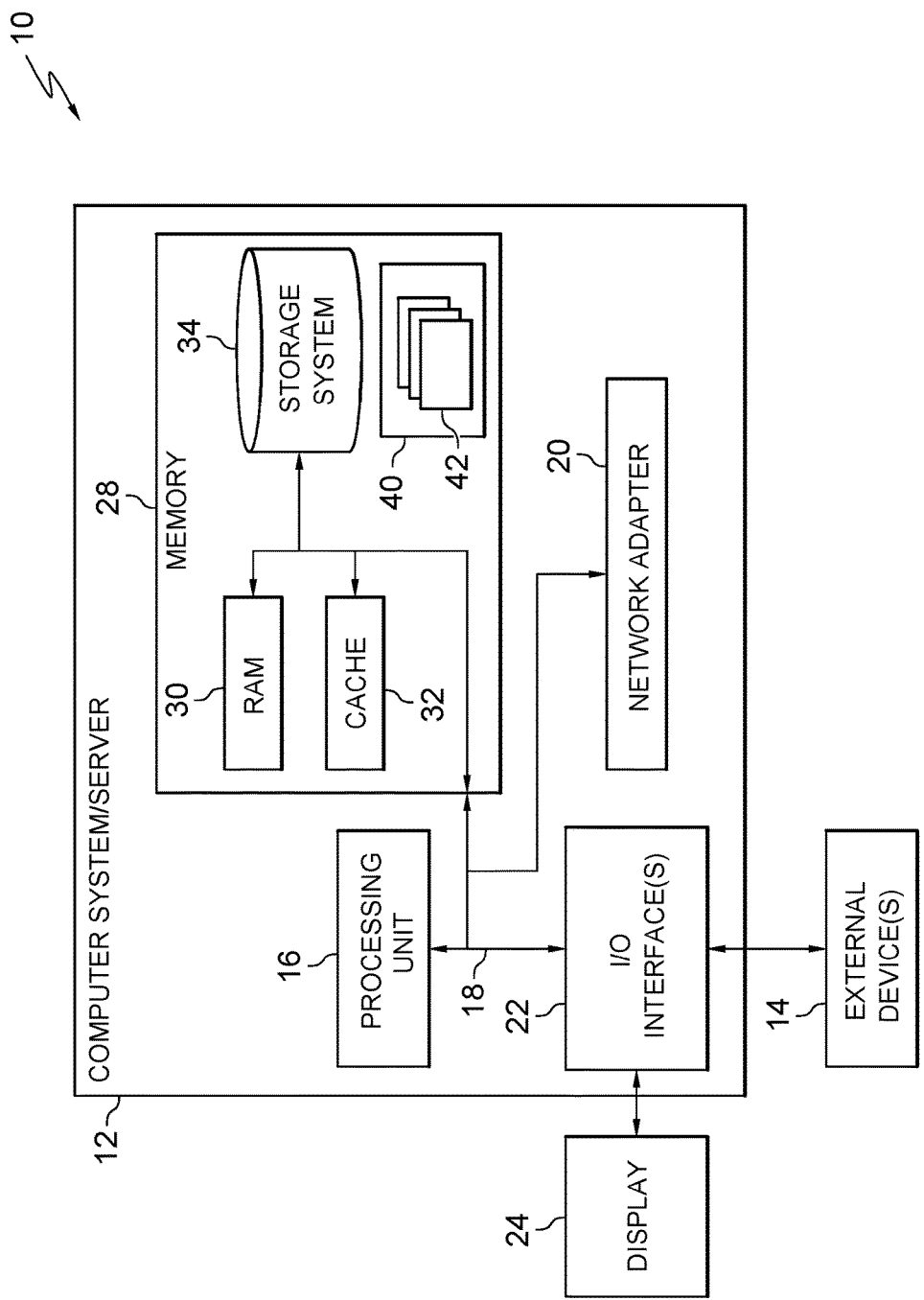
FIG. 1 depicts a cloud computing node according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer data storage systems, and more particular aspects relate to generating block level backups of virtual machines to enable file name level based searching for, and restoration of, files in the block level backups. While the present disclosure is not necessarily limited to such applications, various aspects of the disclosure may be appreciated through a discussion of various examples using this context.

Virtualization enables computing entities to efficiently utilize the resources of powerful computer servers to provide disparate computing environments to customers. Computing entities, for example, may deploy several different operating systems over a physical or hardware layer made up of, for example, a homogenous set of computing servers. The operating systems may be executed in virtual machines managed by a virtualization manager deployed in a virtualization layer between the operating systems and the hardware layer. The virtualization manager may be configured to apportion the resources of computing hardware between the virtual machines. Each virtual machine, for example, may be allocated a datastore to serve as a virtual disk on which the operating systems executing within the virtual machines may create partition and construct filesystems. Virtual disks, like physical disks, may be backed-up periodically to enable recover from system or data integrity failures.

Backup applications executing on computing systems may manage the creation of periodic backups of storage devices allocated to the computing system. The backup applications may execute within the computing systems to identify changed filesystem objects (e.g., files and directories) or disk regions, and to periodically execute operations to copy the changes to a backup server. Computing systems configured to virtualize operating systems and other computing environments may deploy (e.g., install and execute) backup applications within virtualization layers to backup the datastores of virtual machines executing on computing systems. This architecture may reduce the overhead that may be incurred by deploying backup applications in each individual virtual machine. The backup applications may create block level backups that are agnostic of datastores partitions and filesystems. These block level backups may be based on changed blocks of disk drives or datastores. Restoring individual filesystem objects from backup servers storing multiple block level backups may require retrieving each block level backup stored on backup server, mounting each of the retrieved block level backups, reconstructing partitions and filesystems, and then searching the reconstructed partitions and filesystems to identify individual filesystem objects for restoration. Executing these operations to restore a single filesystem object may be both time and resource intensive when multiple block level backups are stored on a backup server.

Embodiments of the present disclosure are based on the recognition that restoring individual file system objects from block level backups of virtual machines may be improved by monitoring and tracking filesystem object creation and modification in a global history table available to backup applications and backup servers. Accordingly, embodiments of the present disclosure are directed towards an architecture (e.g., including systems, methods, and computer program products) for generating and maintaining filesystem object history information as part of block level backups of virtual machines. The architecture includes generating a local history table for tracking filesystem objects that have changed since a last backup of a virtual machine. The local history table may include the changed objects' attributes as well as indications of the type of changes executed on the objects (e.g., the operations executed on the object to case the change). As part of a block level backup process, the local history table may be merged with a global history table on the backup server, where the global history table is configured to track the history of all filesystem objects and their associations to the sets of block level backups of a virtual machine. According to the architecture, a user may identify a block level backup having a version of the filesystem object (e.g., a file or a directory) he/she wishes to restore without having to first mount any of the backups. The filesystem object may instead be identified by searching the global history table. The backup containing the correct version of the filesystem object can then be mounted, and the target filesystem object can be retrieved.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
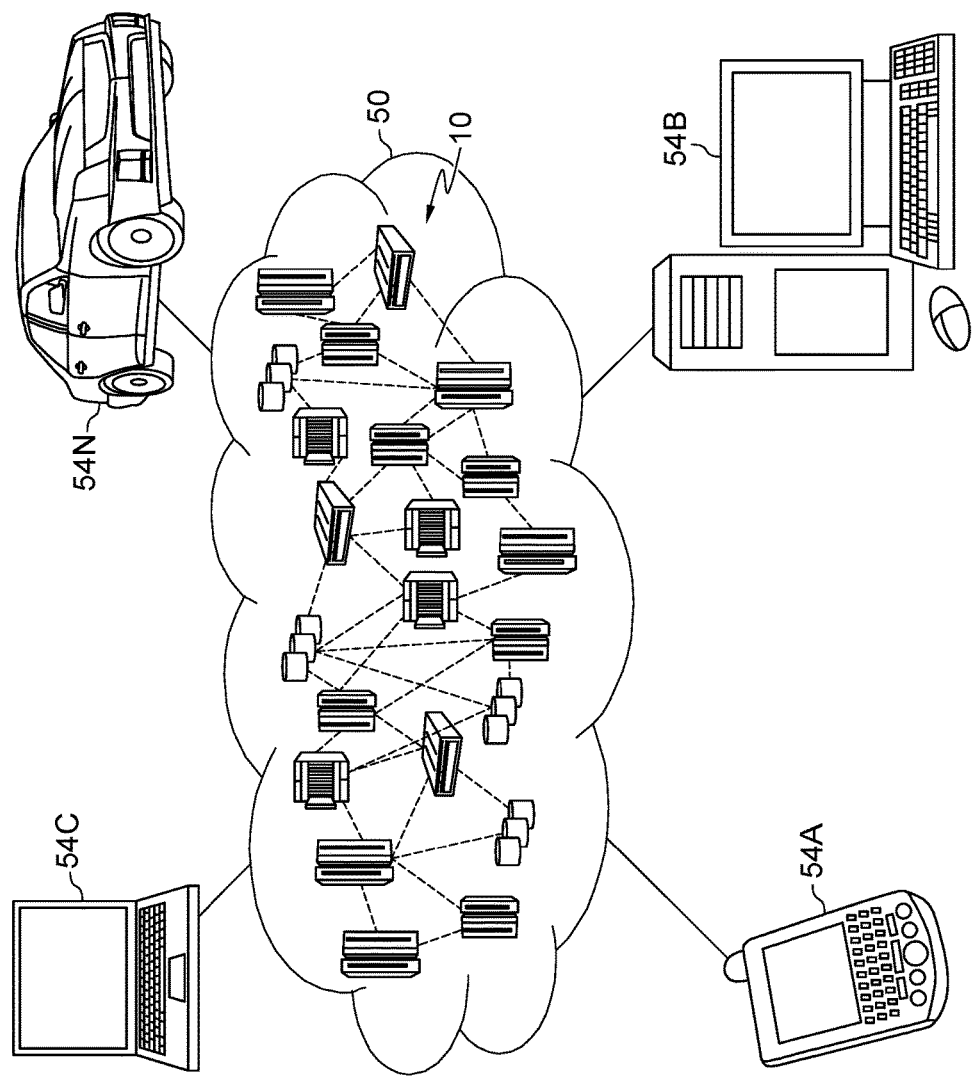
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
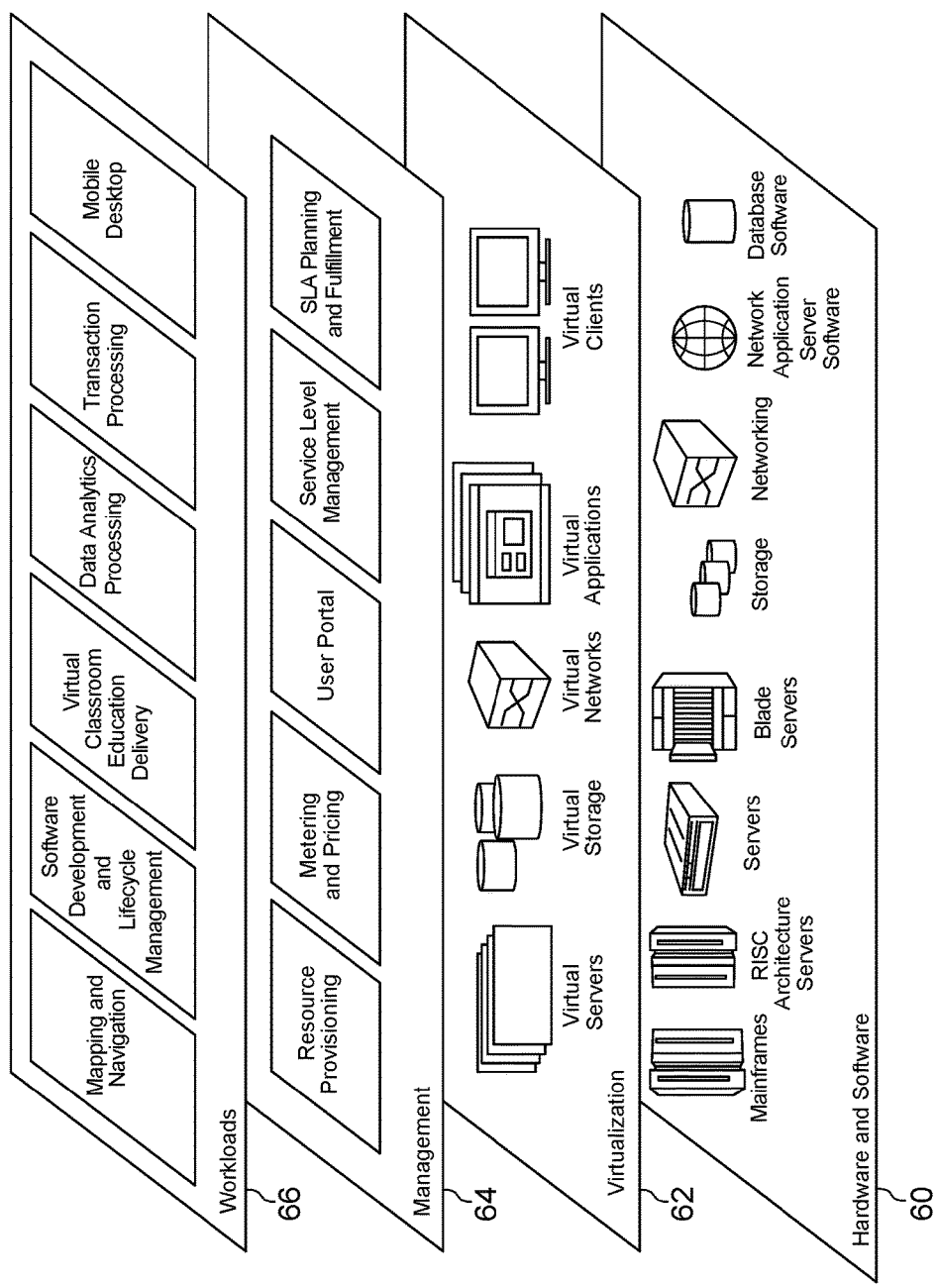
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop.

As used here, creating a block level backup of virtual machine includes the process of identifying blocks that have changed since a previous backup of the virtual machine (e.g., a first backup) or before the current backup when the current backup is the first backup of the virtual machine. The process may further include copying and/or transmitting the identified changed blocks to a backup server for storage.

Figure 4:
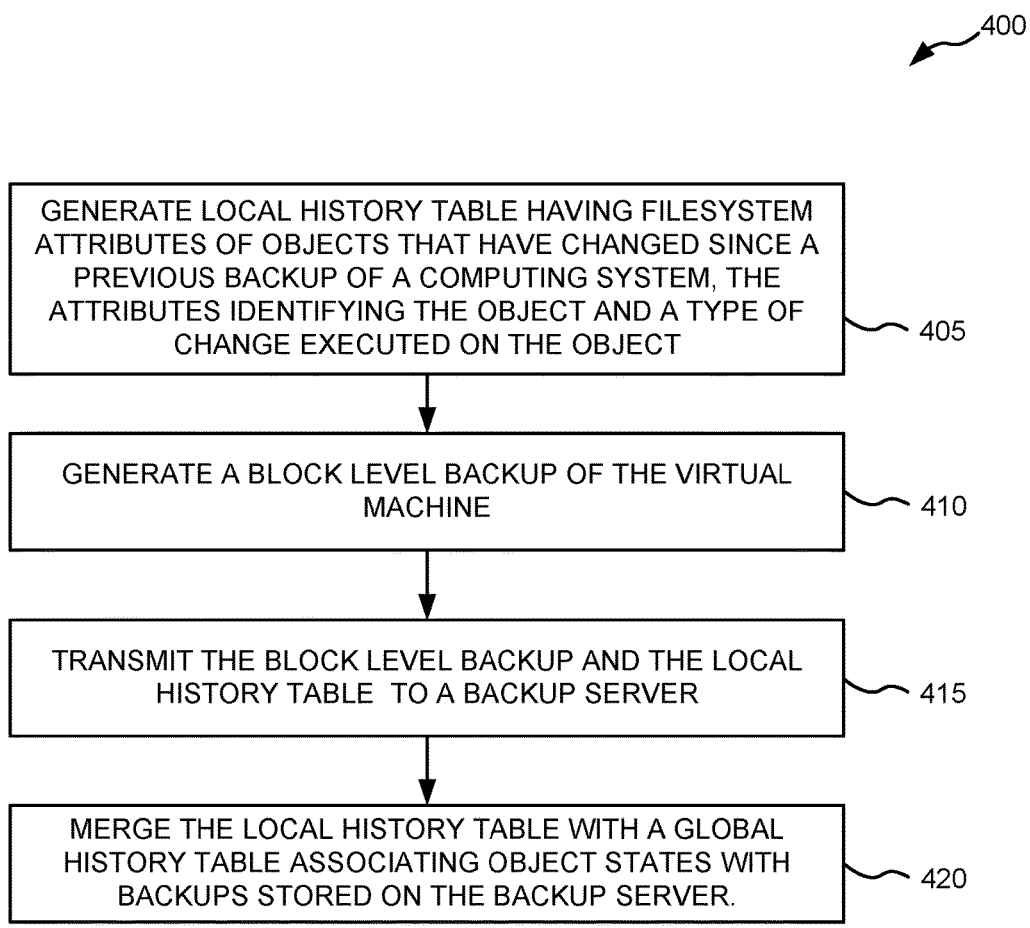
FIG. 4 depicts a flowchart of computer implemented operations for backing-up a virtual machine, according to various embodiments.
Figure 8:
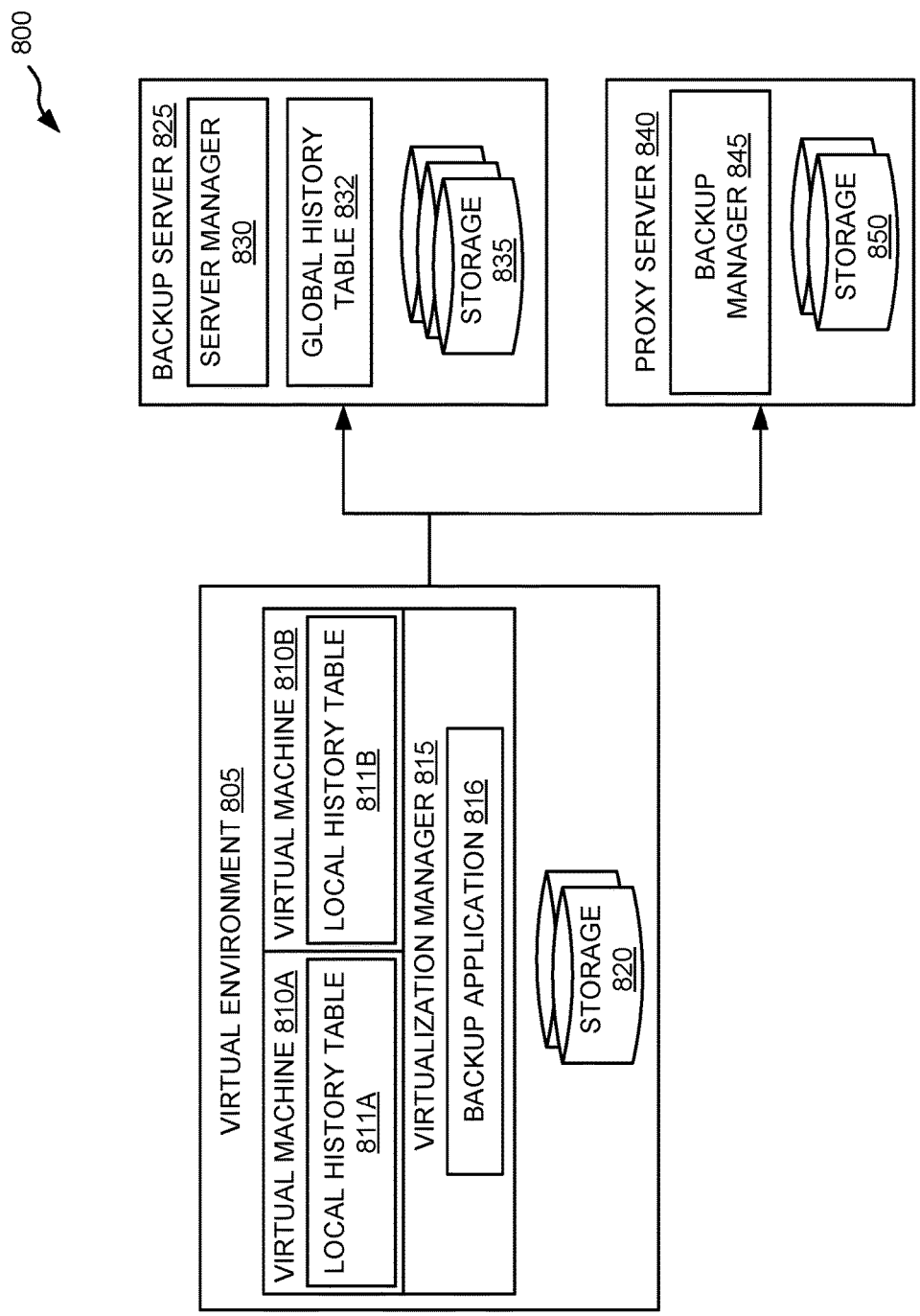
FIG. 8 depicts a block diagram of an example computing environment including systems for creating block level backups of a virtual machine and for retrieving individual filesystem objects from the backups, according to various embodiments.

FIG. 4 depicts a flowchart 400 of computer implemented operations for backing-up a virtual machine, according to various embodiments. In some embodiments, some or all of the computer implemented operations may be executed by a backup application deployed in the virtualization layer of a computing system such as virtualization layer 62 (FIG. 3) and Backup Applications 816 (FIG. 8), or in operating systems installed within a virtual machine. In other embodiments, some or all of the computer implemented operations may be executed by backup software applications executing on a backup server such as the backup server 825 (FIG. 8).

Backup software applications executing may include components deployed within the virtualization layers of computing systems being backed-up to facilitate execution of the computer implemented operations. Collectively, backup software applications, whether executing within virtualization layers and on virtualized operating systems on the computing system being backed up, or on a remote backup server, in combination with supporting hardware such as computing systems and data storage volumes, will be referred to herein as a "backup system". A backup system may execute the computer implemented operations described herein in the time before a first backup of a virtual machine, or in the time between a first and a second backup of a virtual machine. For clarity, the time period in either scenario will be referred to herein as occurring subsequent to a first backup of a virtual machine and prior to a second backup of a virtual machine.

The backup system may execute operation 405 by generating a local history table to track changes to filesystem objects in the period between virtual machine backups. In some embodiments, the local history table may be stored within a virtual machine executing on the computing system or cloud computing platform. The local history table may include information about filesystem objects that have changed since the last backup of a virtual machine. The information may include attributes of the filesystem objects such as the name of the object, the type of object, a unique identifier (ID) of the object, and a unique identifier of the object's parent object. The object name may be a sequence of characters (e.g., a string) assigned by, for example, a user to a filesystem object. A filesystem object name, for example, may be the name of a file or the name of a directory existing in the virtual machine. In some embodiments, the object name may not be unique. In these situations, an object may be further uniquely identified based on other attributes, including the object identifier and its parent object name and or identifier. An object identifier may be a unique sequence of characters, symbols, and/or logical relationships that uniquely identify the object in a filesystem or other computing environment. In some embodiments, an object identifier may be assigned according to an architecture of a virtual machine or other computing system. An object type may be at least one of any class of filesystem objects. Examples of object types include files and directories. A parent of an object may be a first filesystem object which hierarchically precedes a second object in a filesystem or other computing system data structure. As an example, a directory may be considered the parent of any files stored within the directory.

The information stored in the local history table additionally includes an indication of the type of operation executed on a filesystem object to case a change in its state. In certain embodiments, the type of operation may at least one of an object create, delete, change, move, and rename operation. Other operations are possible. An object create operations includes the addition of a new object to a filesystem. The type of operation may be indicated using character strings, symbols, or other identifiers. In some embodiments, the type of operation may be indicated along with a set (e.g., one or more) of parameters associated with the operation. A filesystem object rename operation, for example, may be indicated along with the old (or previous) name of the filesystem object and the new name of the filesystem object. Similarly, an object move operation may be indicated along with a unique identifier of the new parent filesystem object of the relocated object.

In some embodiments, a virtual machine executing on a computing system may generate and maintain a local history table. Filesystem journaling mechanisms associated with the virtual machine may collect information about changed filesystem objects for populating the local history table. In other embodiments, local history tables may be maintained in the virtualization layer of a computing system by a virtualization manager. In these embodiments, information about changed filesystem objects may be collected from the virtual machines via network or inter-process communications mechanisms.

According to various embodiments, information about changed filesystem objects collected by virtual machines may be stored as entries in the rows or columns of the local history table. For the remainder of this disclosure, related data stored in tables (e.g., attribute information for a given filesystem object) will be discussed as if the related data was stored in rows of the tables. The contents of the disclosure, however, equally applies to related data stored in columns of tables. The entries of the local history table may be sorted chronologically by the date and time the changes occurred. For example, when the entries are arranged in rows, a first row in the local history table may include information about the first changed filesystem object, while an Nth or last row in the local history table may include information about the Nth or last filesystem object to change. A filesystem object may have more than one entry in the local history table. For example, if a file system object is modified and then moved, the local history table may include a first entry evidencing the modification and a second entry evidencing the move.

Referring again to the operations of the flowchart 400, the backup system may execute operation 410 to generate a block level backup of the virtual machine. Generating the block level backup may include identifying blocks of a storage device that have changed since a previous backup of the storage device. Generating the block level backup may further include copying or duplicating the identified changed blocks (e.g., locks including changed filesystem objects). The backup system may generate the block level backup using available software applications configured to identify and duplicate changed blocks of a storage device. A software application executing in hardware and software layer 60 (FIG. 3), or executing in virtualization layer (62) (FIG. 3) may periodically scan the storage devices associated with a computing system hosting a virtual machine identify changed blocks. The identified changed blocks may be copied or tagged in a database for future copying. Because these software applications execute outside, and independently, of any virtual machines installed on the computing system, the block level backups may be generated without consideration to the partitioning of, or the filesystems installed on, the datastores allocated to the virtual machines.

The backup system may execute operation 415 to transmit the block level backup and the local history table to the backup server. In some embodiments, the backup server may be a computing system remote to, or from, the computing system hosting the virtual machine being backed-up. In these embodiments, the block level backups and local history table may be transmitted from the hosting computing system to the backup server over a data communications network or via a point-to-point data communications channel. Transmitting a block level backup to a backup server, for example, may include identifying changed data blocks (e.g., data blocks previously tagged in a table or database as described in operation 410) and transmitting an image of these data blocks over a network or a point-to-point communication interface. In other embodiments, the backup server may be the same computing system as the computing system hosting the virtual machine being backed up. In these embodiments, the block level backups and local history table may be transmitted to the backup server through inter-process communication channels. For example, transmitting a block level backup to a backup server in these embodiments may include transmitting a table or database containing data blocks tagged to indicate a change since a previous backup to an application configured to process or store the backups. Similarly, transmitting the local history table to a backup server may include transmitting a pointer to, or the contents of, a file or other data structure containing the local history table to an application configured to process the local history table, as described herein.

The backup system may execute operation 420 to merge the local history table with a global history table associating filesystem object states or a history of filesystem objects with block level backups stored on a backup server. The global history table may be stored on the backup server in a file, database or other data structure. In some embodiments, the global history table consolidates the local history tables from multiple block level backups of a virtual machine over time.

A global history table may include information about each filesystem object having a version or copy stored in one or more block level backups on the backup server. The information stored in the global history table may include a first set of fields to store attributes of the filesystem objects, such as object names, object types, object identifiers, and identifiers of parent objects. These attributes correspond to the attributes stored in local history tables provided to backup servers. The information stored in the global history table may further include a second set of fields (e.g., reference identifier fields) to store reference identifiers for each filesystem object included in the table. Each filesystem object included in the global history table may be associated with one or more reference identifier fields. Each reference identifier field may be correspond with a different backup of a virtual machine. In some embodiments, each reference identifier field may correspond to a backup time of a virtual machine backup. A reference identifier field may be populated with a reference identifier when a block level backup associated with the reference identifier field includes a version of the filesystem object. A block level backup may be associated with a reference identifier field when the field is added to the global history table in response to receiving the block level backup. Similarly, a block level backup may be associated with a reference identifier field when the reference identifier field corresponds to the time at which the block level backup was created or was added to a backup server.

Merging the local history table with a global history table may include updating the global history table with information in the local history table according to the operations specified in the type of operation fields of the local history table, as described herein.

Figure 5:
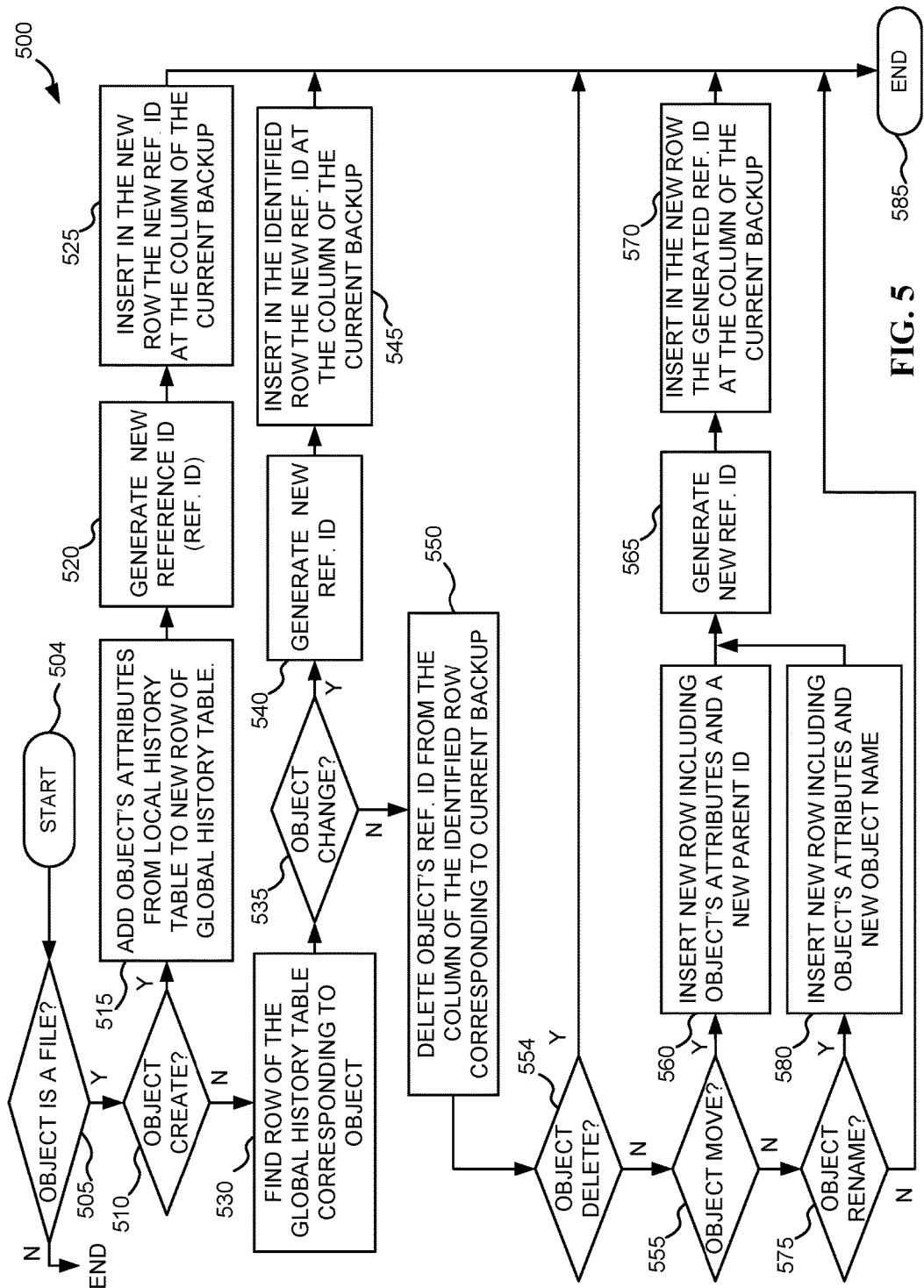
FIG. 5 depicts a flowchart of an example set of computer implemented operations that may be executed to both change filesystem objects, and to update a global history table from a local history table, according to various embodiments.

FIG. 5 depicts a flowchart 500 of an example set of computer implemented operations that may be executed to both change filesystem objects, and to update a global history table from a local history table, according to various embodiments. The operations of the flowchart 500 may be executed by a backup system having components executing on one or more computing systems to generate and store block level backups of a virtual machine, as described herein. The operations of flowchart 500 are discussed in with reference to a "selected filesystem object", a term which means each filesystem object represented in a local history table considered individually or as a set. The operations of flowchart 500 may be executed for each filesystem object represented in a local history table as part of, or in addition to, merge operations 420 (FIG. 4).

The backup system may begin the operations of flowchart 500 at operation 504 by executing one or more software routines to receive, from a data communications interface of a backup server, a block level backup and a local history table from a computing system hosting a virtual machine being backed up. Operation 504 may further be continued by storing the received block level backup on a storage device associated with the backup server. Examples of storage devices may include hard disk drives, solid state drives, and tape drives. The backup system may further execute operation 504 to append a new column of reference identifier fields corresponding to the current backup to (or insert a new column into) each row of a global history table stored on the backup server. In certain embodiments, the backup system may copy the reference identifiers corresponding to the virtual machine backup stored immediately preceding the current virtual machine backup into the new column of reference identifier fields.

The backup system may continue the operations of flowchart 500 by executing operation 505 to determine whether a selected filesystem object is a filesystem file. In some embodiments, the backup system may execute one or more software routines to retrieve the object type of the selected filesystem object from a field of the local history table to determine whether the selected filesystem object is a filesystem file. The backup system may continue to operation 510 when the filesystem object is a filesystem file, while the backup system may end the operations of flowchart 500 when the filesystem object is not a filesystem file.

At operation 510, the backup system may execute one or more software routines to retrieve the operation associated with a change to the selected filesystem object from a field of the local history table to determine whether an object create operation was executed on the selected filesystem object. In some embodiments, the object create operation may be executed by a filesystem to create or add a new filesystem object to a filesystem associated with a virtual machine. The object create operation, for example, may be executed to add a new file to a filesystem. The backup system may continue to operation 515 when the operation associated with a change to the selected filesystem object is an object create operation, while the backup system may proceed to operation 530 when operation associated a with a change to the selected filesystem object is not an object create operation.

The backup system may execute operation 515 to copy the attributes of the selected filesystem object from the local history table to a global history table. In some embodiments, the backup system may execute operation 515 by inserting a new row, including a set of fields to store the attributes of a selected filesystem object, into the global history table. The storage system may then copy the selected filesystem object's attributes from the local history table to the first set of fields of the new row.

At operation 520, the backup system may generate a new reference identifier for the selected filesystem object. In some embodiments, reference identifiers may numbers, characters, or symbols assigned from an ordered set or according to a mathematical or logical algorithm. Generating the new reference identifier may include selecting the next number, character, or symbol available (e.g., the next unused) in the ordered set or generated from the mathematical or logical algorithm. As an example, reference identifiers may be selected from a set of ordered integer numbers. As an example, when five filesystem objects having reference identifiers ranging from 1 to 5 in the reference identifier field for the current virtual machine backup are represented in the global history, the next available reference identifier generated by the backup system for the selected filesystem object may be 6.

At operation 525, the backup system may append a new reference identifier field corresponding with the current backup to (or insert a new reference identifier field into) the new row created in operation 515. The backup system may then populate the new reference field with the new reference identifier generated in operation 520 and proceed to operation 585.

At operation 530, the backup system may parse or search the global history table to find a row corresponding with the selected filesystem object. A row of the global history table may correspond with the selected filesystem object when the row contains information (e.g., filesystem attributes and reference identifiers) associated with the selected filesystem object.

The backup system may then execute operation 535 to determine whether an object change operation was executed on, or is associated with a change to, the selected filesystem object. An object change operation may include operations to, for example, modify the contents of filesystem file. The backup system may continue to operation 540 when an object change operation was executed on the selected filesystem object, while the backup system may proceed to operation 550 when an object change operation was not executed on the filesystem object.

At operation 540, the backup system may generate a new reference identifier corresponding with the current virtual machine backup, as described herein. The new reference identifier may then be written to a reference identifier field corresponding with the current virtual machine backup in the identified row, as shown in operation 545. In some embodiments, a new reference identifier field may be inserted into, or appended to, the identified row before writing the new reference identifier.

At operation 550, the storage system may delete the reference identifier corresponding to the current backup from the identified row.

At operation 554, the storage system may determine whether an object delete operation was executed on, or is associated with a change to, the selected filesystem object. The backup system may continue to operation 585 when an object delete operation was executed on the selected filesystem object, while the backup system may proceed to operation 555 when an object delete operation was not executed on the filesystem object.

At operation 555, the storage system may determine whether an object move operation was executed on, or is associated with a change to, the selected filesystem object. An object move operation may include changing the parent filesystem object of the selected filesystem object from a first parent file system object to a second parent filesystem object. A move operation, for example, may include moving a file from a first directory to a second directory. As described herein, the local history table may include the identifier of the second or new parent object associated with the selected filesystem object when a move operation was executed on the selected filesystem object. The backup system may continue to operation 560 when an object move operation was executed on the selected filesystem object, while the backup system may proceed to operation 575 when an object move operation was not executed on the filesystem object.

At operation 560, the storage system may insert a new row, including a set of fields to store the attributes of the selected filesystem object, into the global history table. The storage system may then copy the selected filesystem object's attributes from the row identified in operation 530 to the set of fields.

At operation 565, the backup system may generate a new reference identifier corresponding with the current backup, as described herein. The backup system may append a new reference identifier field corresponding with the current virtual machine backup to the new row, as shown in operation 570. The backup system may then populate the new reference identifier field with the reference identifier generated in operation 565 and proceed to operation 585.

At operation 575, the storage system may determine whether an object rename operation was executed on, or is associated with a change to, the selected filesystem object. An object rename operation may include changing the name of the selected filesystem object from a first object name to a second object name. In some embodiments, the local history table may include the new name of the selected filesystem object. The backup system may continue to operation 580 when an object rename operation was executed on the selected filesystem object, while the backup system may proceed to operation 585 when an object rename operation was not executed on the selected filesystem object.

At operation 580, the storage system may insert a new row, including a set of fields to store the attributes of the selected object, into the global history table. The storage system may then copy the selected filesystem object's attributes from the row identified in operation 530 to the set of fields. The new object name included in the local history table for the selected filesystem object may then be written to the object name field of the new row. The storage system may then continue the operations of the flowchart 500 at operation 565.

The storage system may end the operations flowchart 500 at operation 585.

Figure 6:
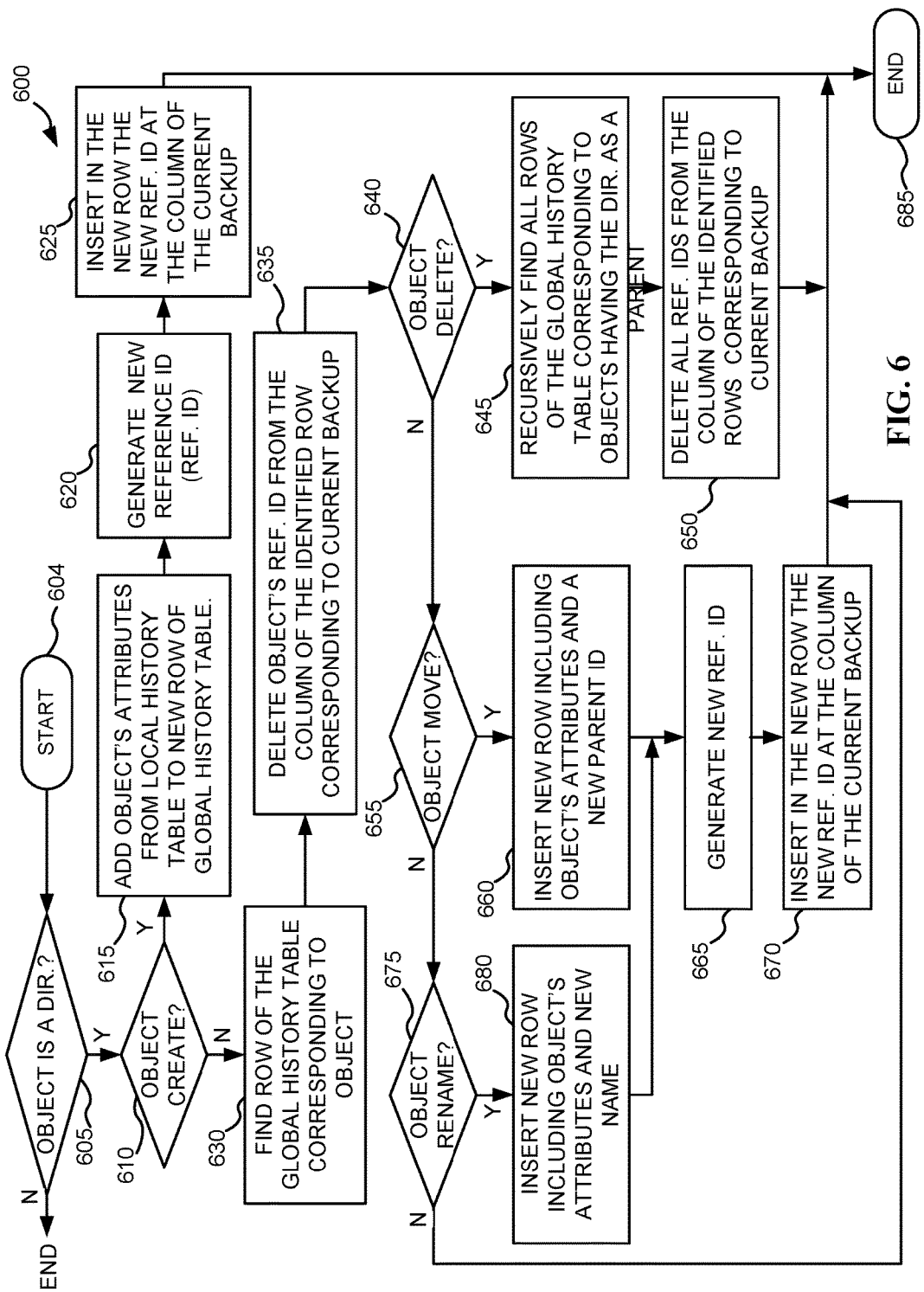
FIG. 6 depicts a flowchart of a second example set of computer implemented operations that may be executed to both change filesystem objects, and to update a global history table from a local history table, according to various embodiments.

FIG. 6 depicts a flowchart 600 of an example set of computer implemented operations that may be executed to both change filesystem objects, and to update a global history table from a local history table, according to various embodiments. The operations of the flowchart 600 may be executed by a backup system having components executing on one or more computing systems to generate block level backups of a virtual machine. The operations of flowchart 600 are discussed in with reference to a "selected filesystem object", a term which means each filesystem object represented in a local history table considered individually or as a set. The operations of flowchart 600 may be executed for each filesystem object represented in the local history table as part of, or in addition to, merge operations 420 (FIG. 4).

The backup system may begin the operations of flowchart 600 by executing operation 604 in accordance with the steps described for executing of operation 504 (FIG. 5).

The backup system may continue the operations of flowchart 600 by executing operation 605 to determine whether a selected filesystem object is a filesystem directory. In some embodiments, the backup system may execute one or more software routines to retrieve the object type of the selected filesystem object from a field of the local history table to determine whether the object is a filesystem directory. The backup system may continue to operation 610 when the selected filesystem object is a filesystem directory, while the backup system may end the operations of flowchart 600 when the selected filesystem object is not a filesystem directory.

At operation 610, the backup system may execute one or more software routines to retrieve the operation associated with a change to the selected filesystem object from a field of the local history table to determine whether an object create operation was executed on the selected filesystem object. In some embodiments, the object create operation may be executed by a filesystem to create or add a new filesystem object to the filesystem. The object create operation, for example, may be executed to add a new directory to a filesystem associated with a virtual machine. The backup system may continue to operation 615 when the operation associated with a change to the selected filesystem object is an object create operation, while the backup system may proceed to operation 630 when the operation associated with a change to the selected filesystem object is not an object create operation.

The backup system may execute operation 615 to insert a new row into a global history table and to copy the attributes of the selected filesystem object from the local history table to global history table in accordance with the operations described for the execution of operation 515 (FIG. 5).

At operation 620, the backup system may generate a new reference identifier for the selected filesystem object, as described herein. At operation 625, the backup system may append a new reference identifier field corresponding with the current virtual machine backup to (or insert a new reference identifier field into) the new row created in operation 615. The backup system may then populate the new reference identifier field with the new reference identifier generated in operation 620 and proceed to operation 685.

At operation 630, the backup system may parse or search the global history table to find a row corresponding with the selected filesystem object.

At operation 635, the backup system may delete the reference identifier corresponding to the current backup from the identified row.

At operation 640, the backup system may determine whether an object delete operation was executed on, or is associated with a change to, the selected filesystem object. The backup system may continue to operation 685 when an object delete operation was executed on the selected filesystem object, while the backup system may proceed to operation 645 when an object delete operation was not executed on the filesystem object.

At operations 645, the backup system may recursively identify all rows of the global history table corresponding to filesystem objects having the selected filesystem object as a parent object. Recursively identifying the rows may include finding all rows descended from the selected filesystem object. The storage system may then continue to operation 650 to delete the reference identifiers corresponding to the current virtual machine backup from each of the identified rows. The backup system may then proceed to operation 685.

The storage may execute operation 655 to determine whether an object move operation was executed on, or is associated with a change to, the selected filesystem object. A move operation, for example, may include moving the selected filesystem object from a first directory to a second directory. The local history table may include the identifier of the second or new parent object associated with the selected director when the change operation is a move operation. The backup system may continue to operation 660 when an object move operation was executed on the selected filesystem object, while the backup system may proceed to operation 675 when an object move operation was not executed on the selected filesystem object.

At operation 660, the storage system may insert a new row, including a set of fields to store the attributes of the selected filesystem object, into the global history table. The storage system may the copy the selected directory's attributes from the row identified in operation 630 to the set of fields.

At operation 665, the backup system may generate a new reference identifier corresponding with the current virtual machine backup, as described herein. The backup system may append a new reference identifier field corresponding with the current virtual machine backup to the new row, as shown in operation 670. The backup system may then populate the new reference identifier field with the new reference identifier generated in operation 665 and proceed to operation 685.

At operation 675, the storage system may determine whether an object rename operation was executed on, or is associated with a change to, the selected filesystem object. In some embodiments, the local history table may include a new name assigned to the selected filesystem object. The backup system may continue to operation 680 when an object rename operation was executed on selected filesystem object, while the backup system may proceed to operation 685 when an object rename operation was not executed on the selected filesystem object.

At operation 680, the storage system may insert a new row, including a set of fields to store the attributes of the selected filesystem object, into the global history table. The storage system may then copy the selected filesystem object's attributes from the row identified in operation 630 to the set of fields. The new object name included in the local history table may then be written to the object name field of the new row. The storage system may then continue the operations of the flowchart 600 at operation 665.

The storage system may end the operations flowchart 600 at operation 685.

Figure 7:
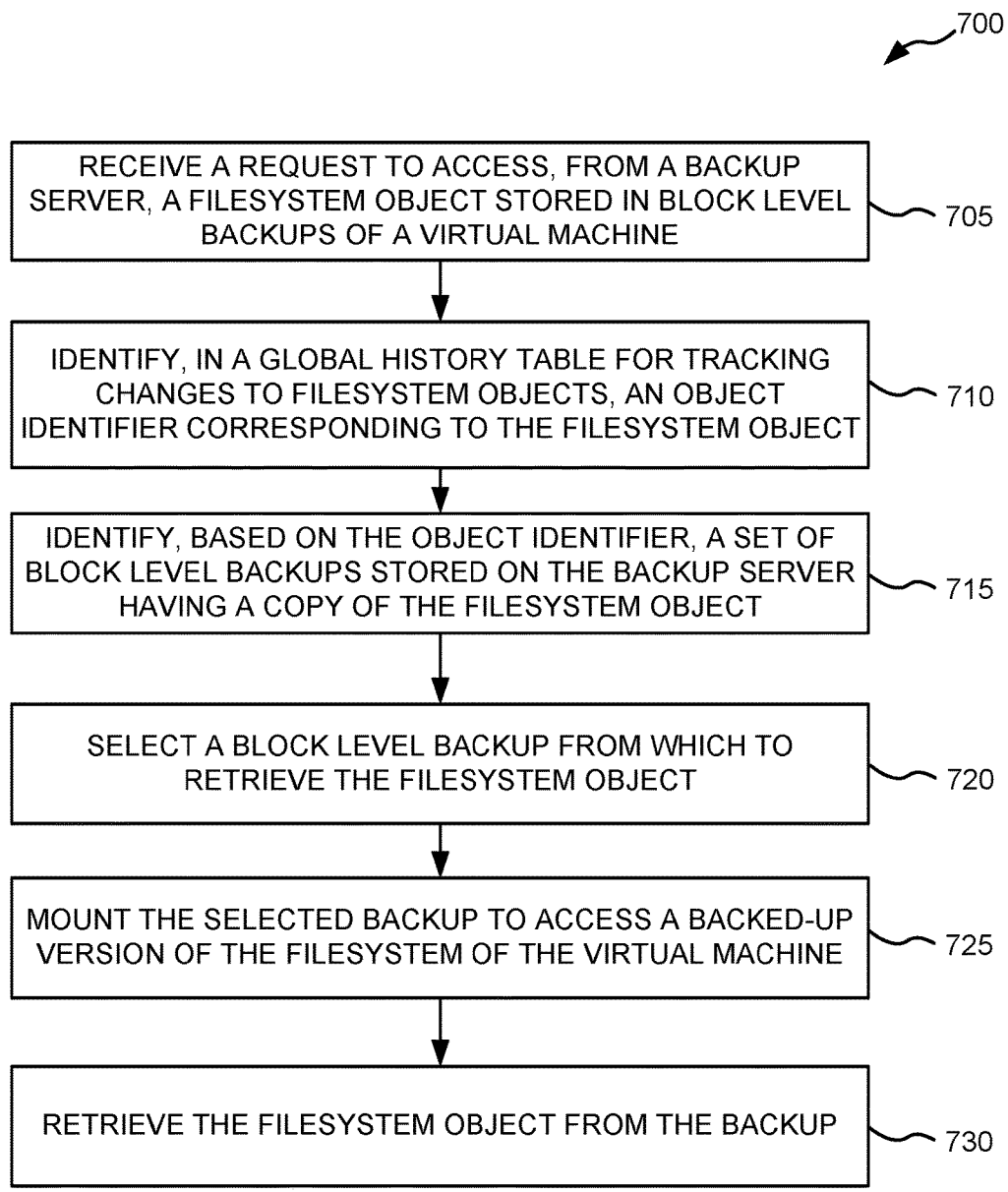
FIG. 7 depicts a flowchart of computer implemented operations for retrieving an individual filesystem object from block level backups of a virtual machine, according to various embodiments.

FIG. 7 depicts a flowchart 700 of computer implemented operations for retrieving an individual filesystem object from block level backups of a virtual machine, according to various embodiments. Some or all of the operations of flowchart 700 may be executed by a backup system, as described herein.

The backup system may begin the operations of flowchart 700 by executing operation 705 to receive a request to access an individual filesystem object stored in a block level backup of a virtual machine. In some embodiments, the request may be received from a user, a computing device, or software and hardware component of a computing system. The request may be received over a data communication network, via inter-process communication mechanisms, and through point to point connections between computing devices. In various embodiments, the request may include a search pattern or expression (e.g., a regular expression) for identifying the requested filesystem object. The search pattern may include characters, symbols, and logical expressions which may be interpreted by a processor associated with the backup system to match one or more attributes of the requested filesystem object.

At operation 710, the backup system may apply the search pattern to a global history table mapping a history of filesystem objects to block level backups of a virtual machine to identify one or more matching filesystem objects. Identifying matching filesystem objects may include identifying rows of the global history table and associated object identifiers that correspond to filesystem objects having an object identifier that logically or canonically match the search pattern.

At operation 715, the backup system may identify a set of one or more block level backup having a given copy or version of the requested filesystem object. Based on the object identifier matched in operation 710, the backup system may identify a row of the global history table corresponding to the requested filesystem object. The identified row may include one or more reference identifiers corresponding to one or more virtual machine backup times or block level backups. Each block level backup may include distinct copies or versions of the requested filesystem object. The backup system may provide, to a user, a list including each of backups having a version of the requested filesystem object. The list may additionally include a complete logical path to the each matching version of the requested object, the matching object's identifier, and the date and/or time each backup was created.

At operation 720, the backup system may select a block level backup from the virtual machine backups identified in operation 715. In some embodiments, the storage system may receive a user selection for the block level backup based on the list provided in operation 715. The user selection may be received through any of the communication mechanisms described herein.

At operation 725, the backup system may mount the selected block level backup to access the backed-up virtual machine's filesystem. The block level backup may be mounted according to known processes for mounting storage devices, disk volumes, and image files. Mounting the block level backup may further include reconstructing any partitions and filesystems included in the backup.

At operation 730, the backup system may retrieve the requested filesystem object from the mounted block level backup. Retrieving the requested filesystem object may include searching reconstructed filesystems based on, for example, the object's identifier and/or a full filesystem path to the requested filesystem object. The full filesystem path may include the object's name or identifier, parent name or identifier, and the object name or identifiers of all objects hierarchically preceding the requested filesystem object. The retrieved filesystem object may then be provided to a user via any of the communication mechanisms described herein.

FIG. 8 depicts a block diagram of an example computing environment 800 including systems for creating block level backups of a virtual machine and for retrieving individual filesystem objects from the backups, according to various embodiments. The example computing environment 800 depicts components of the backup system described herein. The computing environment may include virtual environment 805, proxy server 840 and backup server 825. Components of the computing environment may communicate using any of the data communication mechanisms described herein.

The virtual environment 805 may include virtual machine 810A and 810B, virtualization manager 815 and local storage 820. In some embodiments, the virtual environment 805 corresponds with, or is an embodiment of, the cloud computing environment abstraction shown in FIG. 3. Virtual machines 810A and 810B may include local history table 811A and 811B along with virtualized hardware such as a datastore for constructing partitions and filesystems, as described herein. Virtual machine 810A and 810B may further include operating systems, software application, and application programmer interface mechanisms (APIs) configured to identify and track changed filesystem objects, and to store information about these objects to in local history table 811A and 811B. The software applications and APIs may be further configured to provide the information about the changed objects and/or the local history table to a backup storage system as described herein.

Virtualization manager 815 may include software and/or hardware for managing the virtualization and allocation of resources to virtual machines 810A and 810B. Virtualization manager 815 may include backup application 816. In some embodiments, the backup application 816 may be deployed in virtual machines 810A and 810B. The combination of backup application 816, local history table 811A and 811B, and the object change tracking components associated with virtual machines 810A and 810B may form an object change tracking module configured to extract information about changed filesystem objects that are eligible for backup. In some embodiments, virtualization manager 815 may maintain include local history tables 811A and 811B.

Storage 820 serve as the storage volume for the data stores allocated to virtual machines 810A and 810B. Changed blocks from storage 820 may be periodically identified for backup by a backup system as described herein.

Backup server 825 may be a computing system for storing block level backups of the datastores allocated to virtual machines 810A and 810B. In some embodiments, backup server 825 may be a computing system different from, or remote to, the computing system hosting virtual environment 805. In other embodiments, the backup server may be a component of the computing system hosting virtual environment 805. Backup server 825 may include a server manager 830, global history table 832, and a storage 835. The server manager 830 may be a software application configured to maintain the global history table 832, as described herein. The storage 850 may be any data storage volume configured to store block level backups of virtual machines 810A and 810B, as described herein. The server manager 830 may receive local history table 811A and 811B along with one or more change blocks from virtual environment 805. The server manager may then store the changed blocks in storage 835, and merge the local history table 811A and 811B with the global history table 832, as described herein. In some embodiments, the server manager 830 may process requests to access individual filesystem objects, as described herein.

Proxy server 840 may include backup manager 845 and virtual storage 850. The backup manager 845 may serve as an intermediary between virtual environment 805 and backup server 825. The backup manager 845 may initiate periodic backup operations. In some embodiments, the backup manager 845 may additionally serve as a proxy for processing filesystem object access requests by receiving block level backups from backup server 825 and mounting them to virtual storage 850. In some embodiments the components of proxy server 840 may be included in backup server 825.

FIG. 9 illustrates an example local history table for tacking a history of filesystem objects, according to various embodiments. The example local history table includes an "Object" column to store an object name, a "type" column to store an object's type, an "Obj-ID" column to store an object's identifier, a "Parent Object ID" column to store the object identifier of an object's parent object, a "Change operation" column to store an indication of the type associated with, or executed on, an object to cause a change in the object, and "New object" column to store a name of a new object.

After the local history table is sent to the backup server, the rows in the local history table are erased. Consequentially, after each backup the local history table is empty. This ensures that only new changes are sent to the backup server during each virtual machine backup. The example local history table, however, shows entries from five different backups (T1-T5).

FIG. 10 illustrates an example global history table for tracking a history of filesystem object changes, according to various embodiments. The example global history table includes an "Object" column to store an object name, a "Type" column to store an object's type, "Ref-ID" columns (e.g., reference identifier fields) to store reference identifiers associated with backup times, an "Obj-ID" column to store an object's identifier, a "Parent Object ID" column to store the object identifier of an object's parent object. The "Ref-ID" further include a set of sub-columns for storing corresponding to backup times of each backup stored on a backup server.

Each time a backup of a virtual machine is executed, a new column is added to "Ref-ID" field at backup time Tx. The initial content of this column is copied from the previous backup column (e.g., column Tx-1). The "Object", "Type", "Obj-ID" and "Parent Obj-ID" columns entries in the of the global history table are the same as in the local history table, while the "Ref-ID" value is a number that is provided to a filesystem object in a sequential order depending on the change operation executed on the Object. Other alternative approaches of assigning the "Ref-ID" values are possible.

The following are brief examples of updates to the example global history table based on the example local history table depicted in FIG. 9 and FIG. 10. As an example of an object change operations, at backup time T2, objects D2, F3 and F4 are added to new rows in the example global history table and assigned reference identifiers 4, 5, and 6, respectively. As an example of an object delete operation, at backup time T2, the reference identifier for object F1 is delete from the T2 column of the global history table. As an example of an object or file change operation, at backup time T3, a new reference identifier 10 is added to the T3 column in row of the global history table associated with changed object F2. As an example of an object move operation at backup time T5, filesystem object D1 is moved from parent object 0001 (e.g., the root directory) to parent object 0005 (e.g., directory D2). The move is illustrated at backup time T5 where the reference identifier associated with D1 is deleted, and a new row is added to the bottom of the global history table when the same object name D1, "Type" Dir, "Obj-ID" 002. A new "Parent Obj-ID" 0005 and a new "Ref-ID" 16 is added to the new row. As an example of an object rename operation, at backup time T5, the name of filesystem object D4 was changed to D5. The object rename is illustrated at backup time T5 where the reference identifier for backup time T5 is deleted from the row associated with filesystem object D4. A new row is then added to the global history table with the same "Type" Dir, "Obj-ID" 0011, "Parent Obj-ID" 0005 as object D4. In the example, the new row is the second from the last row in the global history table. The object name in the new row is set to the new object name D5, and a new reference identifier 15 is added to the new row in the "REF-ID" column for the current backup.

Figure 11:
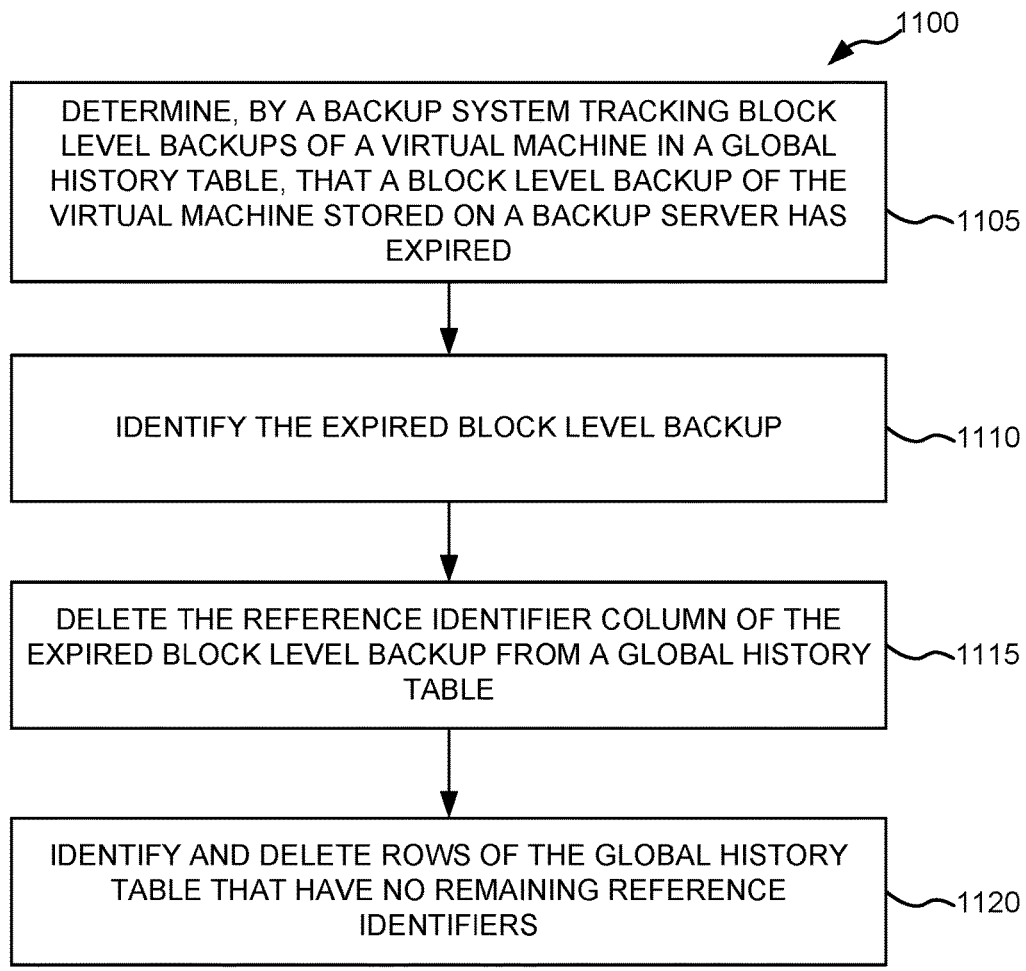
FIG. 11 depicts a flowchart 1100 of an example set of computer implemented operations that may be executed to synchronize virtual machine backups stored on a backup server with a global history table after the expiration of a bock level virtual machine backup.

FIG. 11 depicts a flowchart 1100 of an example set of computer implemented operations that may be executed to synchronize virtual machine backups stored on a backup server with a global history table after the expiration of a bock level virtual machine backup. The operations of the flowchart 1100 may be executed by a backup system having components executing on one or more computing systems to generate and store block level backups of a virtual machine, as described herein.

The backup system may begin the operations of flowchart 1100 at operation 1105 by executing one or more software routines to determine whether a block level backup of a virtual machine has expired. In some embodiments, the backup system may be configured to store a threshold number of block level backups of a virtual machine on a backup server. In these embodiments, a block level backup may expire when the backup system, having stored the threshold number of block level backups on the backup server, receives an additional block level backup to store. For example, a backup system may be configured to store three block level backups of a virtual machine. The backup system, after storing the threshold 3 block level backups, may receive a fourth block level backup to store. In response to receiving the fourth block level backup, the backup system may determine that one of the three previously saved backups have expired.

The backup system may execute operation 1110 to identify an expired block level backup. In some embodiments, the expired block level backup may be the oldest backup stored on a backup server. In other embodiments, the expired block level backup may be determined according to other identification or selection criteria. Identifying the expired block level backup may further include identifying a reference identifier column of the global history table associated with the expired block level backup.

The backup system may execute operation 1115 to delete the reference identifier column for the expired block level backup from the global history table. In some embodiments, the storage system may execute one or more software routines to delete the expired block level backup from the backup server.

The backup system may then execute operation 1120 to identify and delete rows of the global history table that have no more reference identifiers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for backing-up a computing system, comprising:

storing a history of a filesystem directory in a set of fields of a global history table associated with the filesystem directory, wherein a field in the set of fields includes a reference identifier associating the filesystem directory with a computing system backup;

generating a local history table of filesystem objects that have changed since storing a first backup of the computing system, the local history table including attributes of the filesystem objects and a set of operations associated with changes to the filesystem objects;

transferring, from the computing system to a backup server, a second backup of the computing system, the second backup including a block level representation of at least a portion of a data storage medium associated with the computing system including the changed filesystem objects;

merging the local history table with the global history table stored on the backup server, the global history table mapping a history of filesystem objects to a set of block level backups of the computing system including the first backup of the computing system and the second backup of the computing system, wherein the merging comprises updating, for each filesystem object included in the local history table, a set of fields of the global history table associated with the each filesystem object according to at least one operation of the set of operations, the at least one operation selected from at least one of an object create operation, an object delete operation, an object move operation, and an object rename operation, and wherein a filesystem object included in the local history table is a filesystem file and the merging comprises updating a set of fields of the global history table associated with the filesystem file according to a filesystem object change operation;

determining that a third backup has expired;

identifying fields of the global history table associated with the third backup;

deleting the identified fields from the global history table;

identifying, in response to the deleting, filesystem objects in the global history table that do not have fields associating the filesystem object state with a backup; and removing the identified file system objects from the global history table.

* * * * *